United States Patent
Shigeta et al.

(10) Patent No.: US 6,922,202 B2
(45) Date of Patent: Jul. 26, 2005

(54) IMAGE DISPLAY APPARATUS AND METHOD, INFORMATION PROCESSING APPARATUS USING THE IMAGE DISPLAY APPARATUS, AND STORAGE MEDIUM

(75) Inventors: Kazuyuki Shigeta, Kanagawa (JP); Minoru Noji, Kanagawa (JP); Hiroto Yasumura, Shizuoka (JP); Shigehiro Kadota, Tokyo (JP); Toshinori Hirobe, Kanagawa (JP)

(73) Assignee: Canon Kabushiki Kaisha (JP)

( * ) Notice: Subject to any disclaimer, the term of this patent is extended or adjusted under 35 U.S.C. 154(b) by 616 days.

(21) Appl. No.: 09/973,681

(22) Filed: Oct. 9, 2001

(65) Prior Publication Data

US 2002/0075250 A1 Jun. 20, 2002

(30) Foreign Application Priority Data

Oct. 10, 2000 (JP) ...................................... 2000-309268

(51) Int. Cl.⁷ ................................................ G09G 5/02
(52) U.S. Cl. ...................... 345/698; 345/156; 345/179; 345/204
(58) Field of Search ............................... 345/204, 173, 345/179, 156, 619, 698, 763

(56) References Cited

U.S. PATENT DOCUMENTS 5,528,263 A * 6/1996 Platzker et al. ............ 345/156
5,790,114 A * 8/1998 Geaghan et al. ............ 345/763
5,867,159 A * 2/1999 Hamada et al. ............. 345/443
6,100,538 A * 8/2000 Ogawa .................... 250/559.29
6,507,342 B1 * 1/2003 Hirayama .................... 345/440

* cited by examiner

Primary Examiner—Alexander Eisen
Assistant Examiner—Kimnhung Nguyen
(74) Attorney, Agent, or Firm—Rossi Kimms & McDowell, LLP

(57) ABSTRACT

There are provided an image display apparatus and method, which are capable of improving the operability of a white board function thereof, and allowing different devices to be operated on the same screen in a unified manner, and an information processing apparatus having the image display apparatus, and a storage medium storing a program for implementing the method. A control signal input device inputs a control signal. An operation signal output device outputs an operation signal to an external signal source. A memory section stores display screen information. A control signal switching section selectively switches use of the control signal from the control signal input device between a control signal for the display screen information stored in the memory device and the operation signal to be outputted from said operation signal output device.

24 Claims, 9 Drawing Sheets

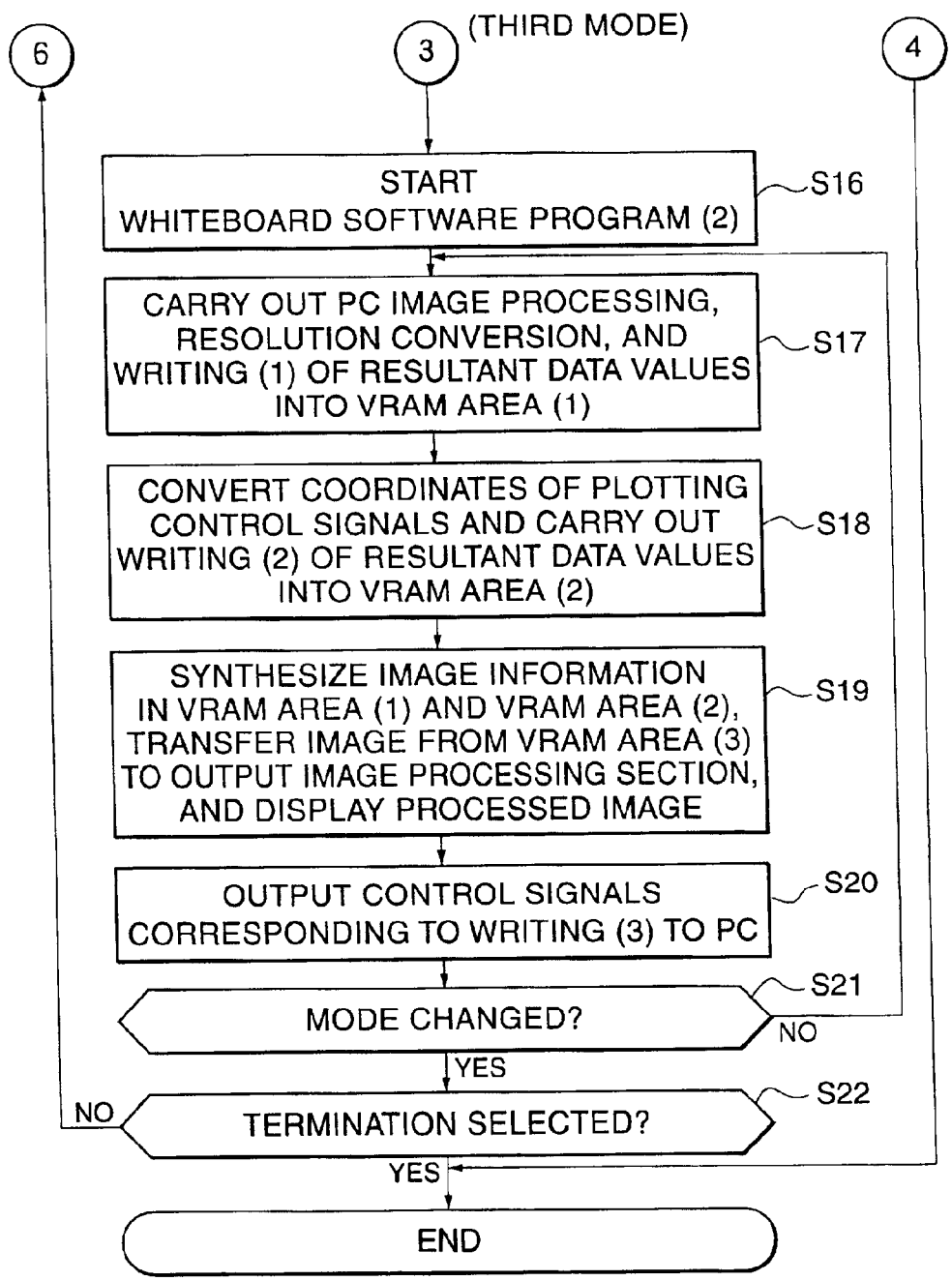

IMAGE DISPLAY APPARATUS AND METHOD, INFORMATION PROCESSING APPARATUS USING THE IMAGE DISPLAY APPARATUS, AND STORAGE MEDIUM

BACKGROUND OF THE INVENTION

1. Field of the Invention

This invention relates to an image display apparatus and method, an information processing apparatus using the image display apparatus, and a storage medium storing a program for implementing the method.

2. Description of the Related Art

With development of multimedia in recent years, displays have come to be widely used in various scenes. Widespread use of devices using image sources in new digital formats, such as HDTV (High-Definition TV), MPEG, or JPEG, and sophistication of three-dimensional graphics not only increase the variety of processable images, but also make it possible to use displays in fields where no displays were conventionally used, thereby increasing the range of uses of displays.

For instance, projectors have come to be widely used at meetings or conferences and presentations. The projectors have been rapidly taking the place of conventional OHP's and prevailing with development of notebook personal computers (personal computer(s) will be hereinafter simply referred to as "PC" or "PC's") and software for use in presentation. Further, the projectors have been changing in manners of connection with presentation tools, such as digital cameras, and other digital devices, as well as in functions thereof.

Another example is the improvement of display sections of portable information terminals. With increase in the number of pixels and the size of a screen, proliferation of color displays, and enhancement in gradation, the functions of such terminals have become more sophisticated and becoming closer to those of PC's.

In this situation, there are an increasing number of occasions when large-screen displays are used in classrooms, offices, homes and other places to provide various image sources e.g. of presentations, various data, video conferences, videos, and movies. Particularly at school and at office meetings, a display apparatus is conveniently used which is not only capable of displaying image information but also functioning as a whiteboard for displaying on a screen information plotted by a teacher or a person presiding a meeting by using an input device such as a digitizer pen.

FIG. 1 is a conceptual representation of a large-screen rear projection display used in a classroom or an office in place of a blackboard or a whiteboard, as an example of displays conventionally used on the above-mentioned occasions, while FIG. 2 shows the construction of the display.

In FIG. 1, reference numeral 601 designates an expositor, and reference numeral 602 a digitizer pen. Reference numeral 603 designates a line plotted on a screen in response to an image-plotting operation by the digitizer. Reference numeral 604 designates a screen of the large-screen display, which will be described in detail with reference to FIG. 2. Further, reference numerals 605 to 607 designate a plurality of windows (virtual child screens) on the PC display screen. In the illustrated example, a single PC is operated, and screens are displayed on the screen 604 according to respective application programs executed by the single PC.

In FIG. 2, reference numeral 701 designates the PC, and reference numeral 702 the large-screen rear projection display with the screen 604 appearing in FIG. 1. Reference numeral 704 designates digitizer detection means for detecting an image-plotting signal from the digitizer pen 602. Reference numeral 705 designates an output terminal via which an image signal is outputted from the PC, and reference numeral 706 a mouse input terminal functioning as a control signal input terminal via which the signal from the digitizer detection means 704 is inputted as a control signal for controlling the PC. Further, reference numeral 707 designates an operating system (OS) (1) of the PC 701, and reference numeral 708 an application program (1) which is one of application software programs operated on the PC 701. Reference numeral 709 designates a whiteboard software program (1) which is also one of the application software programs operated on the PC 701, particularly for realizing a whiteboard function on the PC 701. Actually, the OS (1) 707, the application program (1) 708 and the whiteboard software program (1) 709 are stored and exist as software programs in a storage medium for the PC 701. However, they are shown as false images in FIG. 2 to represent their operations on the PC 701.

Reference numeral 710 designates an image input terminal of the display 702, and reference numeral 711 an input image signal processing section. When an input signal is an analog signal, the input image signal processing section 711 performs adjustment of the input image signal to a predetermined amplitude and a predetermined DC level and converts the analog signal to a digital signal, while when an input signal is a digital signal, the section 711 performs conversion of the signal to a predetermined signal level and to a predetermined color format, and other processing. Reference numeral 712 designates a resolution conversion section that performs conversion of the resolution and frame rate of the image signal, reference numeral 713 an output image processing section that performs signal processing, such as gamma correction and division driving suitable for a device forming an image display section, and reference numeral 714 the image display section comprised of a device, such as a liquid crystal display, a cathode ray tube (CRT), or a plasma display panel (PDP), a drive circuit therefor, a light source and a projecting optical system. The section 714 corresponds to the screen 604 in FIG. 1.

Image-plotting operation is performed by the digitizer pen 602 on an image display surface of the image display section 714 (the screen 604), on which an image is displayed by staring and activating the whiteboard software program (1) 709 together with the application (1) 708 on the OS (1) 707 of the PC 701. The image-plotting signal generated by the digitizer pen 602 is detected by the digitizer detection means 704, and a coordinate signal obtained by converting the image-plotting signal is delivered to the mouse input terminal 706 to operate the whiteboard software program by mouse operation. According to the whiteboard software program, by selectively using one of tools available on the software including a pen and an eraser, the locus of the digitizer pen 602 is plotted on the display screen of the PC 701. This causes the motion of the pen on the screen 604 of the display 702 to agree with the locus of the pen on the display screen of the PC 701. Thus, it is possible to handle files on the display 702 and input characters according to character recognition software by using the digitizer pen 602, whereby the whiteboard function is realized.

In the conventional large-screen display 702, however, the display having the whiteboard function realizes the whiteboard function by the application software program on the PC 701. Therefore, after the power of the display 702 is turned on, it takes time from the start of the PC 701 to authentication of a network to which the PC 701 belongs and a user, and hence the user has to wait to use the display 702 for a considerable time. Further, the PC 701 connected to the display 702 is shared by a number of users, so that the use of the PC 701 is required to be permitted by taking adequate security into consideration, which complicates the process of authentication of the network to which the PC 701 belongs and a user. For instance, even if children happen to want to use the whiteboard function at school for trifles, or if office workers want to use the display 702 for memo paper while talking about a simple arrangement in a casual atmosphere, the above inconvenience at the start of the PC 701 hinders them from using the display 702.

SUMMARY OF THE INVENTION

It is an object of the present invention to provide an image display apparatus and method, which are capable of improving the operability of a white board function thereof, and allowing different devices to be operated on the same screen in a unified manner, and an information processing apparatus having the image display apparatus, and a storage medium storing a program for implementing the method.

To attain the above object, according to a first aspect of the present invention, there is provided an image display apparatus comprising a control signal input device that inputs a control signal, an operation signal output device that outputs an operation signal to an external signal source, a memory device that stores display screen information, and a control signal switching device that selectively switches use of the control signal from the control signal input device between a control signal for the display screen information stored in the memory device and the operation signal to be outputted from the operation signal output device.

Preferably, the control signal switching device selectively switches the use of the control signal in a manner responsive to coordinates of a position in a display area in which the display screen information stored in the memory device is displayed, the position being indicated by the control signal.

Preferably, the image display apparatus further comprises an image signal input device that inputs an image signal from the external signal source, and an image synthesis device that synthesizes the display screen information stored in the memory device and a signal based on the image signal inputted by the image signal input device.

More preferably, the memory device has a plurality of areas which comprise at least an area storing information based on the control signal inputted by the control signal input device, an area storing information based on the image signal inputted by the image signal input device, and information based on a signal obtained by synthesis by the image synthesis device.

To attain the above object, according to a second aspect of the present invention, there is provided an image display apparatus comprising a control signal input device that inputs a control signal, an image signal input device that inputs an image signal from an external signal source, an image signal processing device that processes the inputted image signal, an image display device that displays an image based on the image signal processed by the image signal processing device, on a display screen, an operation signal output device that outputs an operation signal to the external signal source, a memory device that stores display screen information which can be rewritten by the control signal from the control signal input device, an image synthesis device that synthesizes the display screen information stored in the memory device and the image signal processed by the image signal processing device, and a control signal switching device that selectively switches use of the control signal from the control signal input device between a signal for rewriting the display screen information stored in the memory device and the operation signal to be outputted from the operation signal output device, according to an instruction from the control signal input device concerning a display area in which the display screen information stored in the memory device is displayed and a display area in which the image signal processed by the image signal processing device is displayed, the display areas being obtained by synthesis by the image synthesis device.

To attain the above object, according to a third aspect of the present invention, there is provided an information processing apparatus using the image display device according to the first aspect of the present invention.

To attain the above object, according to a fourth aspect of the present invention, there is provided an information processing apparatus using the image display apparatus according to the second aspect of the present invention.

To attain the above object, according to a fifth aspect of the present invention, there is provided an image display method comprising a control signal-inputting step of inputting a control signal, an operation signal-outputting step of outputting an operation signal to an external signal source, a memory step for storing display screen information, and a control signal-switching step of selectively switching use of the control signal inputted at the control signal-inputting step between a control signal for the display screen information stored at the memory step and the operation signal to be outputted at the operation signal-outputting step.

To attain the above object, according to a sixth aspect of the present invention, there is provided an image display method comprising a control signal-inputting step of inputting a control signal, an image signal-inputting step of inputting an image signal from an external signal source, an image signal-processing step of processing the inputted image signal, an image display step of displaying an image based on the image signal processed at the image signal-processing step, on a display screen, an operation signal-outputting step of outputting an operation signal to the external signal source, a memory step of storing display screen information which can be rewritten by the control signal inputted at the control signal-inputting step, an image-synthesizing step of synthesizing the display screen information stored at the memory step and the image signal processed at the image signal-processing step, and a control signal-switching step of selectively switching use of the control signal inputted at the control signal-inputting step between a signal for rewriting the display screen information stored at the memory step and the operation signal to be outputted at the operation signal-outputting step, according to an instruction at the control signal-inputting step concerning a display area in which the display screen information stored at the memory step is displayed and a display area in which the image signal processed at the image signal-processing step, the display areas being obtained by synthesis by the image synthesis step.

To attain the above object, according to a seventh aspect of the present invention, there is provided a computer-readable storage medium storing a program for executing an image display method, the program comprising a control signal input module for inputting a control signal from a control signal input device, an operation signal output module for outputting an operation signal to an external signal source, a memory module for storing display screen information, and a control signal switching module for selectively switching use of the control signal inputted by the control signal input module between a control signal for the display screen information stored by the memory module and the operation signal to be outputted by the operation signal output module.

To attain the above object, according to an eighth aspect of the present invention, there is provided a computer-readable storage medium storing a program for executing an image display method, the program comprising a control signal input module for inputting a control signal from a control signal input device, an image signal input module for inputting an image signal from an external signal source, an image signal processing module for processing the inputted image signal, an image display module for displaying an image based on the image signal processed by the image signal processing module, on a display screen, an operation signal output module for outputting an operation signal to the external signal source, a memory module for storing display screen information which can be rewritten by the control signal inputted by the control signal input module, an image synthesis module for synthesizing the display screen information stored by the memory module and the image signal processed by the image signal processing module, and a control signal switching module for selectively switching use of the control signal inputted by the control signal input module between a signal for rewriting the display screen information stored by the memory module and the operation signal to be outputted by the operation signal output module, according to an instruction by the control signal input module concerning a display area in which the display screen information stored by the memory module is displayed and a display area in which the image signal processed by the image signal processing module is displayed, the display areas being obtained by synthesis by the image synthesis module.

According to the first to eight aspects of the invention, and the preferred embodiments of the first aspect of the present invention, a whiteboard function of the image display apparatus can be realized independently of the external signal source, and therefore it is possible to realize an image display apparatus which when only the whiteboard function is required, a user can readily use simply by starting the apparatus, without being troubled by complicated operation e.g. for authentication of the user at the start of a personal computer.

Preferably, the image signal processing device includes a resolution conversion device that converts resolution of the inputted image signal.

More preferably, the image display apparatus further comprises a second memory device that stores the image signal of which resolution has been converted by the resolution conversion device, and the image synthesis device synthesizes the display screen information stored in the memory device and the image signal stored in the second memory device.

More preferably, the control signal switching device converts display coordinates of a display area after resolution conversion on the display screen to coordinates corresponding to an image before resolution conversion, before sending the operation signal to the operation signal output device.

Preferably, the image display further comprises a third memory device that stores image information obtained by synthesis by the image synthesis device.

According to the above preferred embodiments of the image display apparatus, since the resolution conversion of the inputted image signal is effected, it is possible to enhance operability of the external signal source.

Preferably, the image signal-processing step includes a resolution-converting step of converting resolution of the inputted image signal.

More preferably, the image display method further comprises a second memory step of storing the image signal of which the resolution has been converted at the resolution-converting step, and the display screen information stored at the memory step and the image signal stored at the second memory step are synthesized at the image-synthesizing step.

More preferably, the control signal-switching step includes converting display coordinates of a display area after resolution conversion on the display screen to coordinates corresponding to an image before resolution conversion, before outputting the operation signal at the operation signal-outputting step.

Preferably, the image display method further comprises a third memory step of storing image information obtained by synthesis at the image-synthesizing step.

The above preferred embodiments of the image display method provide the same advantageous effects as provided by the above preferred embodiments of the image display apparatus according to the first aspect of the present invention.

Preferably, the image signal processing module includes a resolution conversion module for converting resolution of the inputted image signal.

More preferably, the program further comprises a second memory module for storing the image signal of which the resolution has been converted by the resolution conversion module, and the image synthesis module synthesizes the display screen information stored by the memory module and the image signal stored by the second memory module.

More preferably, the control signal switching module converts display coordinates of a display area after resolution conversion on the display screen to coordinates corresponding to an image before resolution conversion, before sending the operation signal to the operation signal output module.

Preferably, the program further comprises a third memory module for storing image information obtained by synthesis by the image synthesis module.

The above preferred embodiments of the storage medium provide the same advantageous effect as provided by the above preferred embodiments of the image display apparatus according to the first aspect of the present invention.

Preferably, the image display apparatus further comprises a transfer device that transfers image information obtained by synthesis by the image synthesis device to an external device.

Similarly, the image display method further comprises a transfer step of transferring image information obtained by synthesis at the image-synthesizing step to an external device.

Similarly, the program further comprises a transfer module for transferring image information obtained by synthesis by the image synthesis module to an external device.

According to these preferred embodiment, the user is allowed to use the same screen and the same control means to operate different apparatuses, setting of display areas, exchange of image information, and so forth, which makes it possible to realize a user-friendly and high-performance image display apparatus.

Preferably, the control signal switching device changes a boundary between the display area in which the display screen information stored in the memory device is displayed and the display area in which the image signal processed by the image signal processing device is displayed on an image synthesized by the image synthesis device, based on the control signal from the control signal input device.

Similarly, the control signal-switching step includes changing a boundary between the display area in which the display screen information stored at the memory step is displayed and the display area in which the image signal processed at the image-processing step is displayed, on an image synthesized at the image-synthesizing step, based on the control signal inputted at the control signal-inputting step.

Similarly, the control signal switching module changes a boundary between the display area in which the display screen information stored by the memory module is displayed and the display area in which the image signal processed by the image processing module is displayed on an image synthesized by the image synthesis module based on the control signal inputted by the control signal input module.

According to these preferred embodiments, it is possible to use the control signal from the same control signal input means, such as a digitizer pen, to change a boundary of each of the display area for an image plotted by the internal whiteboard function and the display area of the image signal from an external apparatus, which are displayed separately. This makes it possible to operate two apparatuses on different platforms in a unified manner by using the same display section and the same control signal input means, thereby realizing a seamless environment.

The above and other objects, features, and advantages of the present invention will become more apparent from the following detailed description taken in conjunction with the accompanying drawings.

BRIEF DESCRIPTION OF THE DRAWINGS

FIG. 9 is a continued part of the FIG. 7 and FIG. 8 flowchart.

DETAILED DESCRIPTION OF PREFERRED EMBODIMENTS

The present invention will now be described in detail with reference to the drawings showing embodiments thereof.

Figure 1:
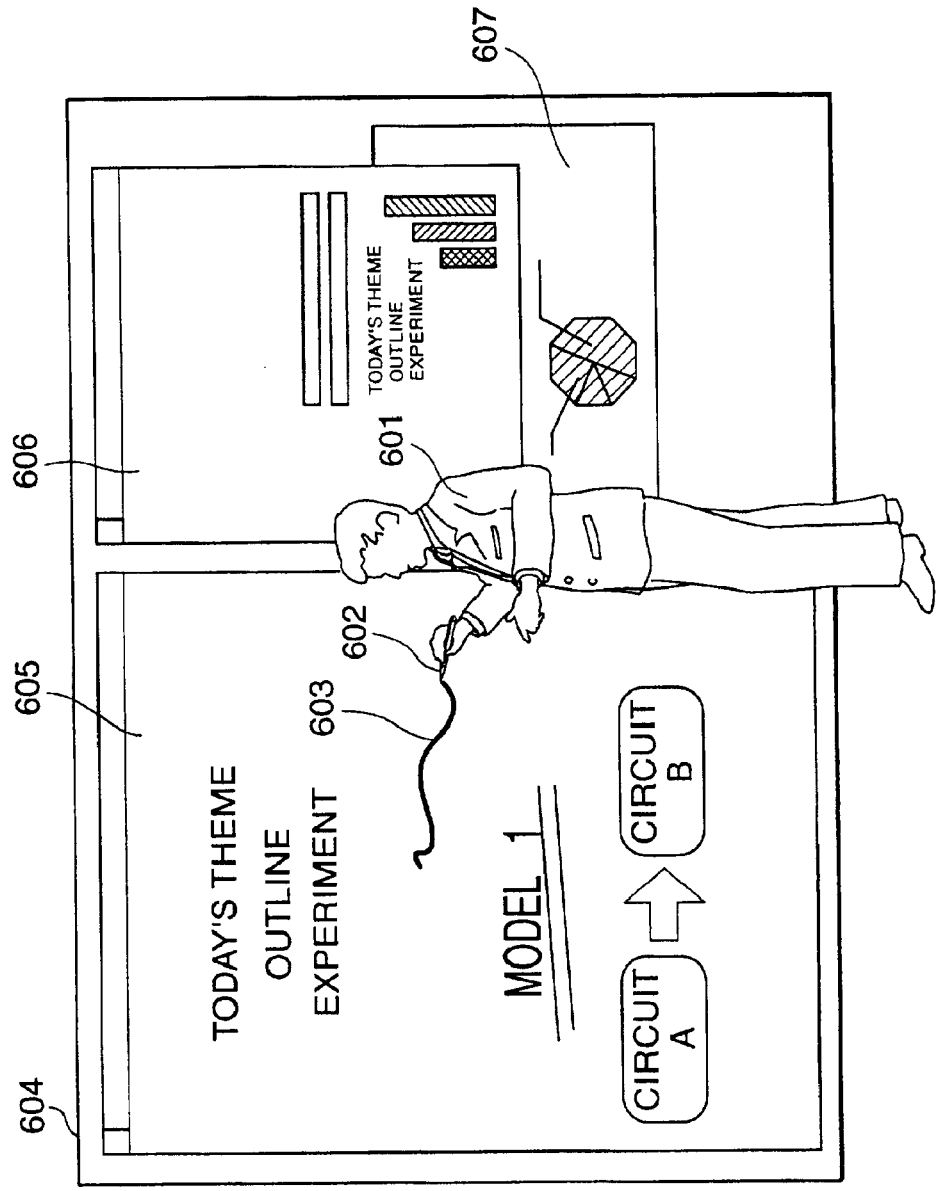
FIG. 1 is a view useful in explaining a whiteboard function of a conventional image display apparatus.
Figure 2:
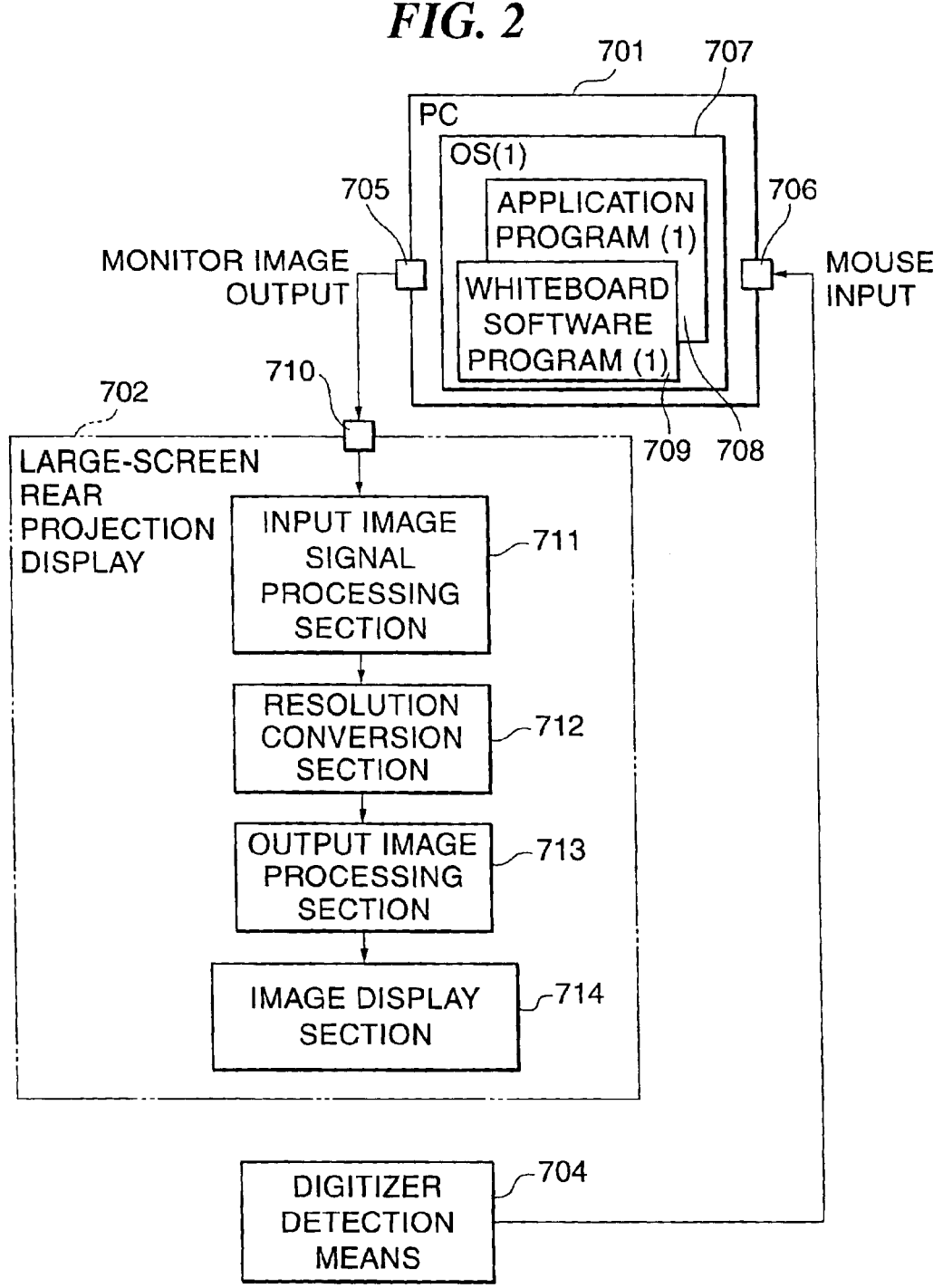
FIG. 2 is a block diagram showing the construction of a control section of the FIG. 1 image display apparatus.
Figure 3:
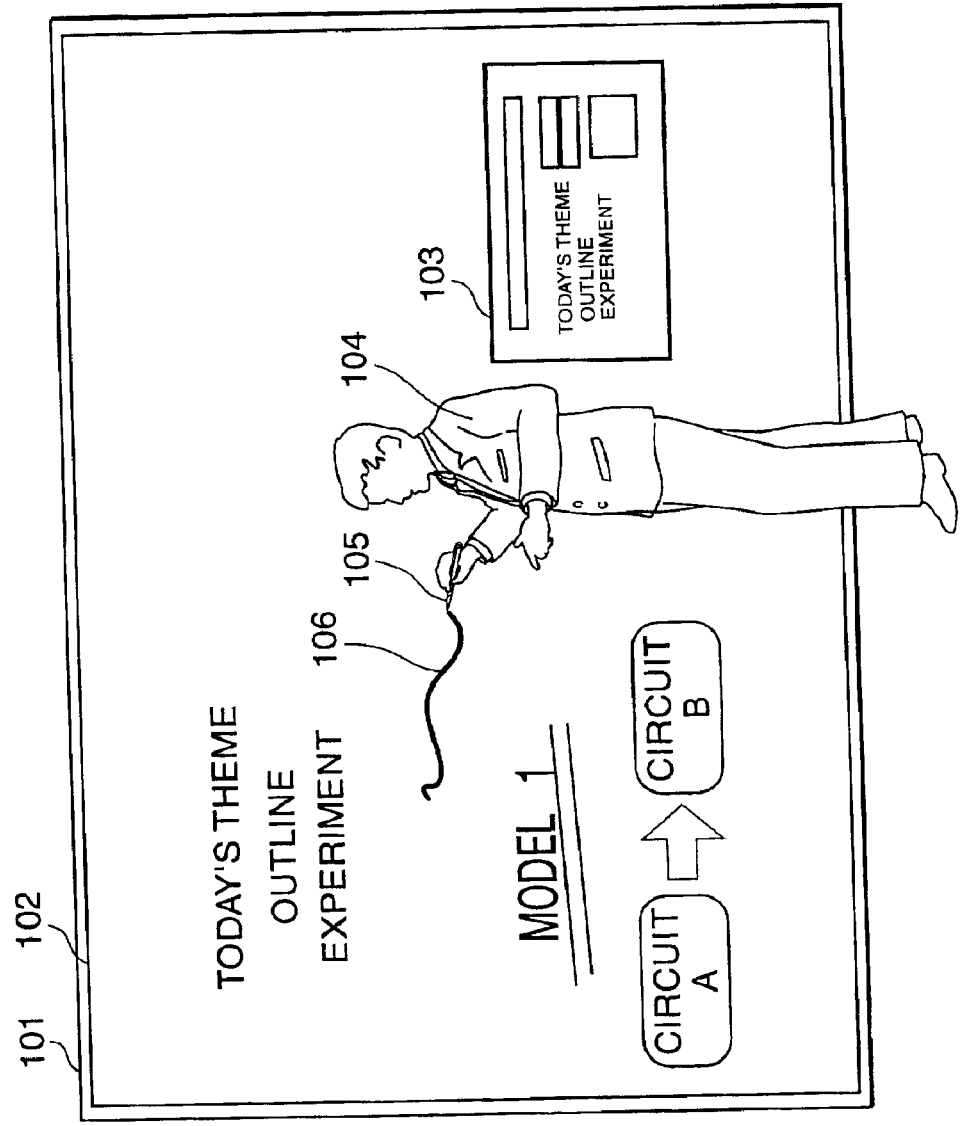
FIG. 3 is a view useful in explaining the whiteboard function of an image display apparatus according to a first embodiment of the present invention.

FIG. 3 is a view which is useful in explaining the whiteboard function of an image display apparatus according to a first embodiment of the present invention.

The image display apparatus according to the first embodiment is comprised of a large-screen rear projection display having a screen 101 shown in FIG. 3. This kind of display is used in place of a blackboard or a whiteboard in classrooms or in offices.

In FIG. 3, reference numeral 101 designates a screen of the large-screen rear projection display, reference numeral 102 a whiteboard screen on which an image is plotted by using the whiteboard function of the present image display apparatus, reference numeral 103 a display screen of a PC, described in detail hereinafter, connected to the display, and reference numeral 104 an expositor. Reference numeral 105 designates a digitizer pen (input device) for use in giving an explanation. Further, reference numeral 106 designates a line plotted on the screen in response to user's image-plotting operation by using the digitizer pen 105. This figure shows a scene in which the expositor 104 is giving an explanation while viewing the display screen 103 and plotting characters and a figure with the digitizer pen 105 by making use of the whiteboard function of the present image display apparatus.

Figure 4:
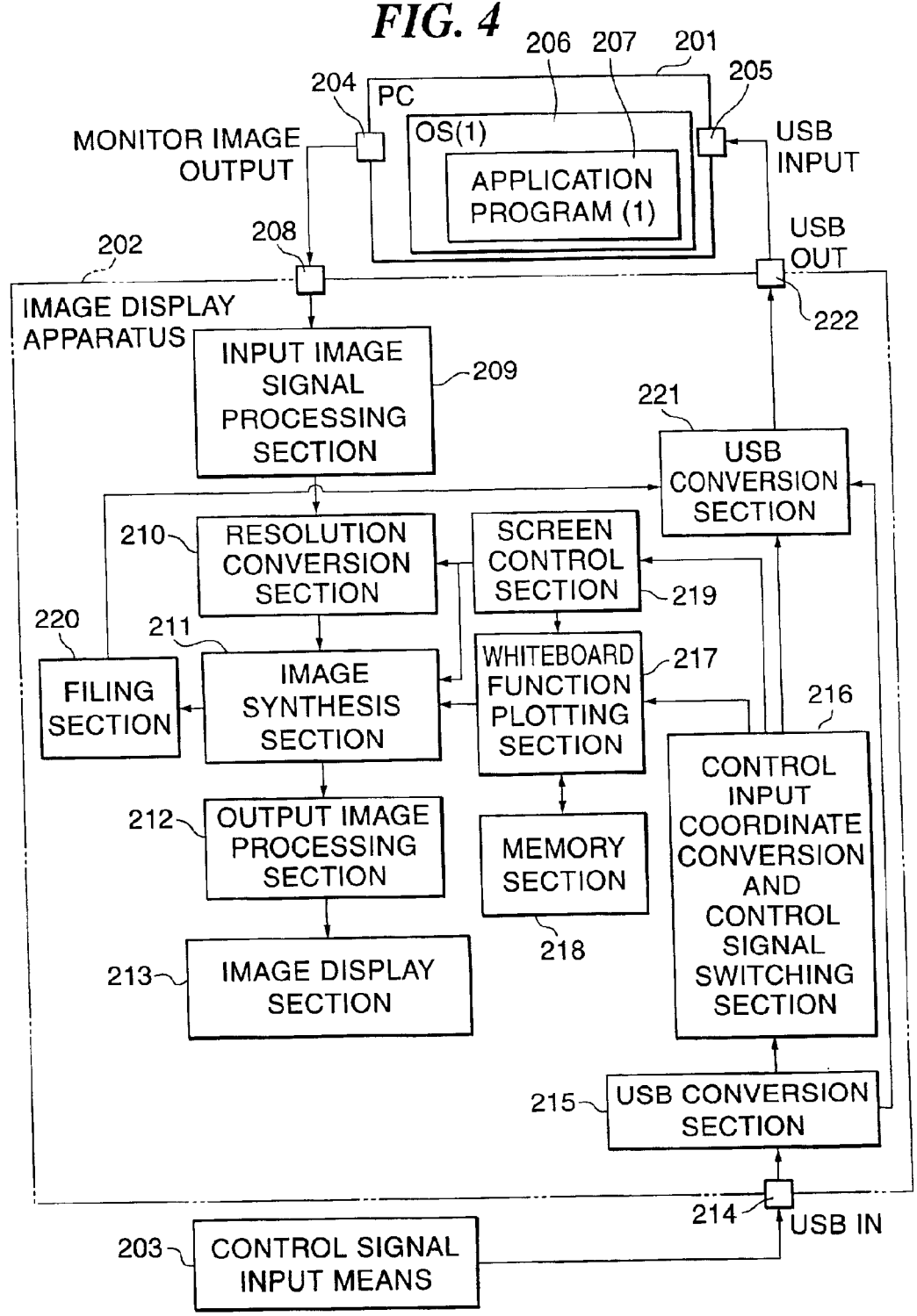
FIG. 4 is a block diagram showing the construction of a control section of the FIG. 3 image display apparatus.

FIG. 4 shows the construction of a control section of the FIG. 3 image display apparatus.

In FIG. 4, reference numeral 201 designates a PC serving as an external signal source that supplies an image signal to the image display apparatus, and reference numeral 202 the image display apparatus having the whiteboard function. The image display apparatus 202 includes the large-screen rear projection display. Further, reference numeral 203 designates a control signal input means that detects an image-plotting signal from the digitizer pen 105 and inputs a signal (control signal) according to the detected image-plotting signal to the image display apparatus 202.

Reference numeral 204 collectively designates image output terminals of the PC, such as an analog VGA terminal, and digital terminals including a DVI terminal, and an IEEE 1394 terminal, via which image signals are outputted. Reference numeral 205 collectively designates control signal input terminals of the PC 201, such as a USB terminal, an IEEE 1394 terminal, a serial terminal and a mouse terminal, via which a coordinate signal obtained in the image display apparatus by conversion and use dependent-switching of a signal from the control signal input means 203 is inputted to the PC 201 from the image display apparatus as the control signal.

Reference numeral 206 designates an operating system (OS) (1) of the PC 701, and reference numeral 207 an application program (1) which is one of application software programs executed on the PC 201. Actually, the OS(1) 206 and the application program(1) 207 are stored and exist as software programs in a storage medium for the PC 201. However, they are shown as false images in FIG. 4 to represent their operations on the PC 201.

Reference numeral 208 collectively designates image signal input terminals of the image display apparatus, such as an analog VGA terminal, and digital terminals including a DVI terminal, an IEEE 1394 terminal and a D terminal. Reference numeral 209 designates an input image signal processing section. When an input signal is an analog signal, the input image signal processing section 209 adjusts the input image signal to a predetermined amplitude and to a predetermined DC level, and converts the same to a digital signal, while when an input signal is a digital signal, the section 209 performs conversion of the signal to a predetermined signal level and to a predetermined color format, and other signal processing. Reference numeral 210 designates a resolution conversion section that performs conversion of the resolution and frame rate of the image signal and like processing. The resolution conversion section 210 accommodates a variation in the input image due to a difference in the format of the image signal, and at the same time performs suitable interpolating processing of the image signal adapted to the number of pixels on the display screen according to a display range set by the user, followed by delivering the resulting signal to an image synthesis section 211, referred to hereinafter. The resolution conversion section 210 includes a memory device for storing image signals after conversion of the resolution and frame rate thereof.

Reference numeral 211 designates the image synthesis section. The image synthesis section 211 switches between a whiteboard image-plotting signal from a whiteboard function plotting section 217 provided in the image display apparatus 202 and the image signal from the signal source inputted via the terminal 208 and then subjected to the above-described signal processing, such as the resolution conversion, and carries out image synthesis based on the whiteboard image-plotting signal and the image signal when both signals are selected. The image synthesis section 211 includes a memory device for storing information of the synthesized image.

Reference numeral 212 designates an output image processing section. The output image processing section 212 performs signal processing, such as gamma correction and division driving suitable for a device forming an image display section 213. Reference numeral 213 designates the image display section comprised of a reflective or transmission liquid crystal display, a direct-view type liquid crystal display, a self-emitting display including a cathode ray tube (CRT) and a laser display, a plasma display panel (PDP), an EL element, an LED, or a projection mirror device, and a drive circuit therefor.

Further, reference numeral 214 collectively designates control signal input terminals, such as a USB terminal, an IEEE 1394 terminal, a serial terminal and a mouse terminal. Each control signal input terminal 214 inputs a detection signal from the control signal input means 203 including the digitizer pen 105 to the image display apparatus 252. In the present embodiment, the following description will be given based on an illustrated example in which a control signal between the control signal input means 203 and the image display apparatus 202 and a control signal between the PC 201 and the image display apparatus 202 are signals conforming to the USB standard.

Reference numeral 215 designates a USB conversion section for decoding a USB signal into a coordinate signal. Reference numeral 216 designates a control input coordinate conversion and control signal switching section (hereinafter simply referred to as "the control signal switching section 216"). The control signal switching section 216 selectively determines whether the coordinate signal should be used as the whiteboard image-plotting signal, or as a signal for instructing a change in a boundary between a display area of the white board image-plotting signal and a display area of the image signal which are displayed by the aforementioned synthesis, or as a control signal delivered to the PC 201, according to an instruction selected from a menu option displayed on the display screen, or an instruction inputted by using a button, not shown, provided on the image display apparatus 202, or by using a button provided in the control signal input means 203, or according to coordinates of a position on the display screen designated by the control signal input means 203. The control signal switching section 216 also converts the coordinates of the signal according to a use thereof. The above-mentioned selective determination according to the coordinates of a position on the display screen designated by the control signal input means 203 is carried out in the following manner: If a display area of the white board image-plotting signal which is one of the two signals synthesized by the image synthesis section is indicated by the coordinates of the position, the control signal from the control signal input means 203 is used for a signal for plotting an image by the whiteboard function (control signal; rewriting signal); if a display area of the image signal from the PC 201 inputted via the terminal 208 is indicated by the coordinates of the position, the same is used as the control signal (operation signal) delivered to the PC 201, and if a boundary between the two display areas is indicated by the coordinates of the position, the same is used for instructing a change in the display areas of the image displayed by the above-described synthesis.

Reference numeral 218 designates a memory section of the whiteboard function plotting section 217. The whiteboard function plotting section 217 specifies a memory address within the memory section 218 for data replacement, based on the coordinate signal delivered from the control signal input means 203 after having been selected as the whiteboard image-plotting signal and subjected to coordinate conversion by the control signal switching section 216. At this time, a method of arithmetic operation is selected in response to an instruction by a menu button, not shown, or an icon button, not shown, displayed on the display screen or by a button, not shown, provided in the body, not shown, of the image display apparatus 202 or attached to the control signal input means 203, and an arithmetic operation is performed on data after the data replacement with reference to data before the data replacement. Now, a description will be given of an operation performed e.g. when a red pen icon and an eraser icon are displayed on a white display screen within an image-plotting area realizing a color display using the three primary colors of red, blue and green, each with values of 0 to 255. With respect to coordinates of a signal delivered from the control signal input means 203 after the pen icon has been selected, data at designated coordinates within a memory area storing red images has a value thereof replaced by the maximum value 255, regardless of the value of the data before the replacement. Further, when the values of respective red, blue and green data are all 255 before data replacement, in memory areas storing blue images and green images, respectively, the blue data and the green data are each replaced by data having a value of 0, whereas in the other cases, blue data and green data remain displayed without replacement. As a result, white portions of an image plotted by the pen are displayed in a manner written or painted in red, and the other color portions are displayed in colors obtained by mixing the red color and another color by the additive color process. For instance, when a red line is plotted on a blue portion, red is mixed with blue, and the resulting color is magenta. If it is preferred that the white portions of the image plotted by the pen are displayed in red, and the other color portions are displayed in mixed colors obtained by the subtractive color process, values of the respective colors calculated by using the data before replacement are each stored in a corresponding one of the memory areas storing the respective red, blue and green images.

On the other hand, with respect to coordinates of a signal delivered from the control signal input means 203 after the eraser icon has been selected, data at designated coordinates within each of the memory areas storing the respective red, blue and green images has a value thereof replaced by the maximum value 255, regardless of the value of the data before the replacement. As a result, portions plotted after selection of the eraser are displayed in white in a manner such that the plotted lines and the like are erased.

The above arithmetic operations may be performed by hardware, i.e. by a logic circuit within a semiconductor device, or alternatively by software, i.e. by a program stored in a storage medium, not shown, which is executed by a microcomputer, not shown, within the image display apparatus 202.

A screen control section 219 controls an image display screen by using the coordinate signal selected and outputted by the control signal switching section 216 as the signal for controlling both a display area for an image based on the image signal inputted via the DVI terminal 208 and a display area for an image plotted based on the whiteboard image-plotting signal by the whiteboard function plotting section 217. The screen control section 219 controls a resolution conversion part of the resolution conversion section 210 based on the size, resolution and display position of an image designated by the microcomputer, not shown, and inputted via the DVI terminal 208, and reads out an image with a size, a position and a resolution, which are required for display, in proper timing with respect to a synchronizing signal. Further, the screen control section 219 controls the whiteboard function plotting section 217 based on the size and display position of the image designated by the microcomputer, not shown, and plotted by the whiteboard function, and reads out an image with a size and a position, which are required for display, in proper timing with respect to the synchronizing signal. Further, responsive to an instruction from the microcomputer, not shown, the screen control section 219 controls the image synthesis section 211 to switch the mode of operation to a mode for displaying only an image plotted by the whiteboard function, a mode for displaying only an image inputted via the DVI terminal 208, a mode for displaying a synthesized image of the two images on a parent screen and a child screen, or a mode for displaying a synthesized image of the two images on left and right screens.

Reference numeral 220 designates a filing section for filing image data. The filing section 220 records a desired image selected by the image synthesis section 211 onto a medium or transmits the image to an external device. Reference numeral 221 designates a USB conversion section for encoding image data transferred from the filing section 220 and control data delivered from the control signal input means 203 and selected as the control signal for the PC 201 by the signal switching section 216, into a signal conforming to the USB standard. Further, reference numeral 222 designates a control signal output terminal, such as a USB terminal, an IEEE 1394 terminal, a serial terminal or a mouse terminal. In the present example, the USB terminal is employed. From the control signal output terminal 222, a coordinate signal obtained by conversion and use dependent-switching of the signal from the control signal input means 203 of the image display apparatus 202 is outputted as the control signal to the PC 201, and image data filed by the filing section 220 is transmitted to the PC 201.

Although the USB conversion section 215 and the USB conversion section 221 are shown as separate sections in FIG. 4, actually in many cases, they are provided as a one-piece USB semiconductor chip equipped with a HUB function. Therefore, in such a case, USB data can be directly transferred from the USB conversion section 215 to the USB conversion section 221 without being sent to the control signal switching section 216.

The overall operation of the image display apparatus 202 according to the present embodiment is controlled by the microcomputer, not shown, incorporated in the image display apparatus 202.

As described above, the image display apparatus 202 has an image processing section including the whiteboard function plotting section 217 for plotting an image based on the control signal from the control signal input means 203, and the memory section 218 as storage means used by the whiteboard function plotting section 217, which are separately provided in addition to the input image signal processing section 209 to which the image signal is inputted. The image processing section has the function of selectively displaying an image generated from the inputted image signal and an image plotted by the whiteboard function or synthesizing the two images and displaying the synthesized image. Further, the image display apparatus 202 is capable of causing the control signal switching section 216 to selectively determine whether the control signal from the control signal input means 203 should be used as a signal for image plotting by the whiteboard function, as a signal for changing a display area of the synthesized image, or as a control signal which is outputted to the PC 201 connected to the device 202, in response to an instruction selected from a menu option displayed on the display screen or a button in the body of the image display apparatus 202, or by a button attached to the control signal input means 203, or according to position information designated on the display screen by the control signal input means 203, thereby enabling the function of the PC 201 and the whiteboard function within the image display apparatus 202 to be operated on the same screen by the identical control signal input means 203.

Further, the image display apparatus 202 is capable of transmitting a whiteboard image or a whiteboard image synthesized with an input image signal to an external device or recording the same onto a recording medium. Therefore, an image plotted by the whiteboard function within the image display apparatus 202 can be outputted to the PC 201 and an external network connected to the PC 201. Consequently, even when no image signal is inputted, if the whiteboard function plotting section 217 alone is selected for use by the image synthesis section 211, it is possible to use the whiteboard function, so that a user who wants to use the whiteboard function alone does not have to wait over a time period from the start of the PC 201 connected to the image display apparatus 202 and until a network to which the PC 201 belongs and the user are authenticated.

Further, the whiteboard function can be utilized without any knowledge of the PC 201 and the like, and hence the image display apparatus 202 realizes an apparatus which requires no complicated operation for such authentications and can be readily used even by a child who is not able to operate a computer.

Moreover, the image display apparatus 202 is capable of displaying a screen of the PC 201 subjected to resolution conversion as a child screen within a whiteboard plotting screen, so that the whiteboard function build into the image display apparatus 202 and the function of an image display apparatus for the PC 201 can be improved in a synergistic or cooperative manner.

Furthermore, since the whiteboard function is separated from an application program on the PC 201 that requires authentication or the like, an environment demanding no security (e.g. the whiteboard function) and an environment ensuring security (e.g. the application program on the PC 201) can be separated from each other, which makes it possible to use the image display apparatus 202 according to its use at a classroom or at a meeting. For example, at a classroom, after children have discussed freely by using only the whiteboard function of the image display apparatus 202, a teacher logs on to the network through authentication of his PC 201 and sends a necessary file therefrom to another PC 201 connected to the image display apparatus 202 to thereby allow a program to be started to read in the file. Then, the teacher carries out two-screen display of an image of the file on the PC 201 and images on the whiteboard screen plotted by the children, and comments thereon. In this case, since the children do not need to operate the PC 201, there is no fear of an important file or data within the PC 201 being erroneously rewritten by the children.

Further, since an image inputted from the PC 201 and subjected to resolution conversion and an image plotted by the whiteboard function within the image display apparatus 202 can be synthesized with each other, it is not necessary to operate, on the PC 201, a special application program for synthesizing and displaying the two images, and setting an environment for manipulating the two images on the same screen, which makes the image display apparatus 202 connectable to any PC 201. Even when an expositor uses a notebook PC of his/her own as the PC 201, it is not necessary to install an application software program designed specially for the image display apparatus 202 on the notebook PC.

In addition, since an image plotted by the whiteboard function or an image synthesized from such a plotted image and an image from an input image signal can be transmitted to an external device or recorded onto a recording medium, and since operations in both an environment demanding no security (e.g. the whiteboard function) and an environment ensuring security (e.g. the application program on the PC 201) and control of display screen areas in the respective two environments can be performed in response to a signal from the control signal input means 203, it is possible to use the same image display apparatus and the same external input device to operate in a unified way the whiteboard function built into the body of the image display apparatus and the function of an application program executed by the PC which is on a different platform from the whiteboard function, thereby realizing a seamless environment.

For example, let it be assumed that workers of a company are discussing some matter in a casual atmosphere at their office while using the whiteboard function alone and that someone happens to come up with an interesting idea during the discussion. Then, if they want to keep the minutes and circulate the same, one of them starts a PC 201 to undergo authentication and switch the operation mode of the display device to the two-screen display mode for displaying both an image by the whiteboard function and a screen of the PC 201. In this case, the switching of the screen mode, setting of the position and size of the screen area, and mouse control within the started PC 201 are all carried out by using a signal obtained by converting the control signal from the digitizer by the signal switching section 216. This allows all the operations to be performed on the same screen of the display apparatus by using the same digitizer pen 105. Further, since image data from the image synthesis section 211 is saved as it is in a file by the filing section 220 without being processed, and then transmitted as a packet via the same USB terminal via which the control signal is transferred, it is possible to have a discussion again with reference to the image by using a whiteboard facility realized by another application program or the like executed on the PC 201 or to distribute the file by attaching the same to an email as minutes by E-mail software.

In the present embodiment, an image inputted from the PC 201 via the image signal input terminal 208 can also be temporarily stored in a memory section other than the memory section 218 and then synthesized with an image from the memory section 218 by the image synthesis section 211.

Although in the present embodiment, the memory section 218 and the image signal processing section 209 are provided as two different processing sections separated in terms of hardware, the memory section 218 and the above other memory section may use different memory areas on the same recording medium. Further, the function of the image-plotting part of the memory section 218 and that of the image signal processing section 209 can also be implemented by software on the same hardware, such as a CPU or a graphic IC. The present invention may be applied to such a case without departing from the essential features of the present invention.

One of the objects of the present invention is to realize an image display apparatus which is capable of simultaneously displaying both a screen for performing a function requiring authentication on a host PC and a screen for performing the whiteboard function requiring no authentication, thereby being flexibly adaptable to different uses of the apparatus e.g. between an expositor and auditors whose position is different from that of the expositor in terms of security against unauthorized access. A further object of the present invention is to enable control of the PC and the image display apparatus and data exchange between the two by using common control means, such as a digitizer, for the PC and the image display apparatus whose platform is different from that of the PC, thereby realizing a seamless presentation tool. These functions are necessary not only to a large-screen display, but also to other types of image display apparatus in some cases.

In the following, a description will be given of an information processing apparatus using an image display apparatus according to a second embodiment of the present invention, with reference to drawings showing the same.

Figure 5:
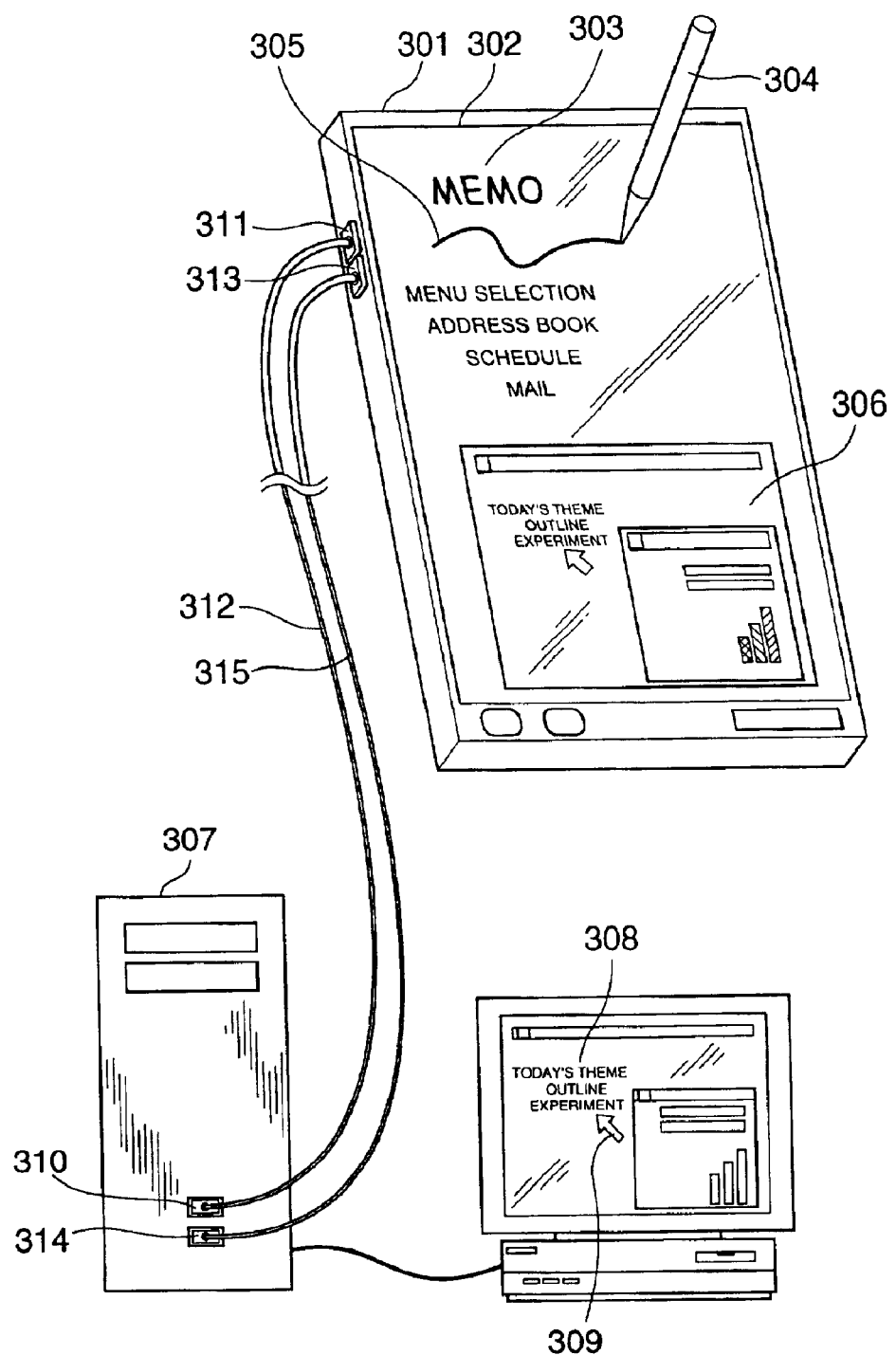
FIG. 5 is a view useful in explaining the whiteboard function of a portable information terminal using an image display apparatus according to a second embodiment of the present invention.

FIG. 5 is a view useful in explaining the whiteboard function of the information processing apparatus using the image display apparatus according to the second embodiment.

The image display apparatus of the second embodiment is applied to a portable information terminal having a whiteboard function implemented for personal use by circuitry allowing a software process to be executed by the same hardware such as a CPU or a graphic IC.

The portable information terminal shown in the figure functions as a single device having a normal whiteboard function when it is not connected to a PC, whereas when connected to the PC, it functions as a device which is capable of displaying a screen of the PC and makes it possible to control the PC by the same control means that controls the portable information terminal itself.

For example, a student who owns this portable information terminal usually utilizes the function of the terminal as a single device, and when required, can use the function of the device as a terminal to refer to information on a PC screen transmitted from a teacher by comparing the same with information written on a whiteboard of the device or to save the information from the teacher in the device.

In FIG. 5, reference numeral 301 designates the portable information terminal using the image display apparatus according to the second embodiment. Reference numeral 302 designates a display screen of the portable information terminal 301, and reference numeral 303 a screen for realizing the whiteboard function built into the portable information terminal 301. Reference numeral 304 designates a digitizer pen for use as an input device of this terminal, and reference numeral 305 a line plotted by the digitizer pen 304 by using the whiteboard function. Further, reference numeral 307 designates a PC, and reference numeral 306 designates an area on which a display screen on the PC 307 connected to the portable information terminal 301 is displayed in a manner synthesized with the screen 303. Reference numeral 308 designates a display connected to the PC 307 via a cable. Images on the display 308 are also displayed on the area 306. Reference numeral 309 designates a control cursor of the PC 307 displayed on the display 308, for controlling the PC 307.

Reference numeral 310 designates an image output terminal of the PC 307, while reference numeral 311 designates an image input terminal of the portable information terminal 301. Reference numeral 312 designates a cable for transmitting an image. The connection interface used here may be an analog VGA cable or a digital cable, such as a DVI cable, an IEEE 1394 cable or a USB cable, and not only a normal RGB serial signal and a TMDS signal but also a MPEG compressed image signal and a packetized image signal are transmitted via the connection interface.

Reference numeral 313 designates an output terminal via which is outputted a control signal for transmitting an operation signal for operating the PC 307 or an image synthesized within the portable information terminal 301, as a file or packets, while reference numeral 314 designates an input terminal of the PC 307 via which the control signal is inputted into the PC 307. Further, reference numeral 315 designates a connection cable for use in transfer of the control signal. The interface for use in outputting the control signal may be a conventional serial communication interface, such as the RS232C interface, the IEEE 1394 interface or the USB interface. Although in the illustrated example, the interface for image transmission and the interface for control signal output are provided by cables, it goes without saying that radio transmission of the control signal may be employed without changing the essential features of the present invention.

In a first mode, the portable information terminal 301 functions alone as a personal information tool having the whiteboard function as one of its functions. The digitizer pen 304 and a control button arranged on the body of the portable information terminal 301 are used to select functions built into the portable information terminal 301 or designate coordinates of a plotted image for whiteboard plotting.

In a second mode, only the screen which is displayed on the area 306 in FIG. 5 is displayed on the whole display screen 302. In this case, the portable information terminal 301 functions as a terminal of the PC 307. More specifically, the digitizer pen 304 and the control button on the body of the terminal 301 can be operated similarly to an external mouse of the PC 307 to move a cursor which is displayed on the area 306 in a manner corresponding to the cursor 309 on the display 308, in the same screen as the display 308. In this mode, the platform of the portable information terminal 301, such as an OS of the same, is hidden, which makes the portable information terminal 301 appear as if it were operating on a software program installed on the PC 307.

In a third mode, as shown in FIG. 5, the screen for the whiteboard function and the display screen of the PC 307 are displayed in a synthesized manner. At this time, the screen of the PC 307 has been subjected to resolution conversion and a proper interpolating process according to the size of the area 306 on a child screen. In this mode, the digitizer pen 304 and the control button on the body of the terminal 301 are operated similarly to the external mouse of the PC 307 to move the cursor which is displayed on the area 306 in a manner corresponding to the cursor 309 on the display 308, on the area 306, and select functions built into the portable information terminal 301 or designate coordinates of a plotted image for whiteboard plotting, on the screen 303. Further, the digitizer pen 304 and the control button can be used to designate an area indicative of a boundary between the screen 303 and the area 306 to thereby change the size and position of the display area of each of the screen 303 and the area 306. In this mode, on the screen 303, the portable information terminal 301 operates on the platform, such as the OS within the terminal 301, whereas on the area 306, the terminal 301 operates as if operating on a software program executed by the PC 307, thereby making it possible to control the two apparatuses in different environments by the same or common control means. Further, the portable information terminal 301 can file a synthesized image and store the file in the storage medium of the terminal 301 or can packetize the synthesized image and transmit the packet to the PC 307 via the connection cable 315 or the like, thereby sharing the synthesized image with the PC 307.

Figure 6:
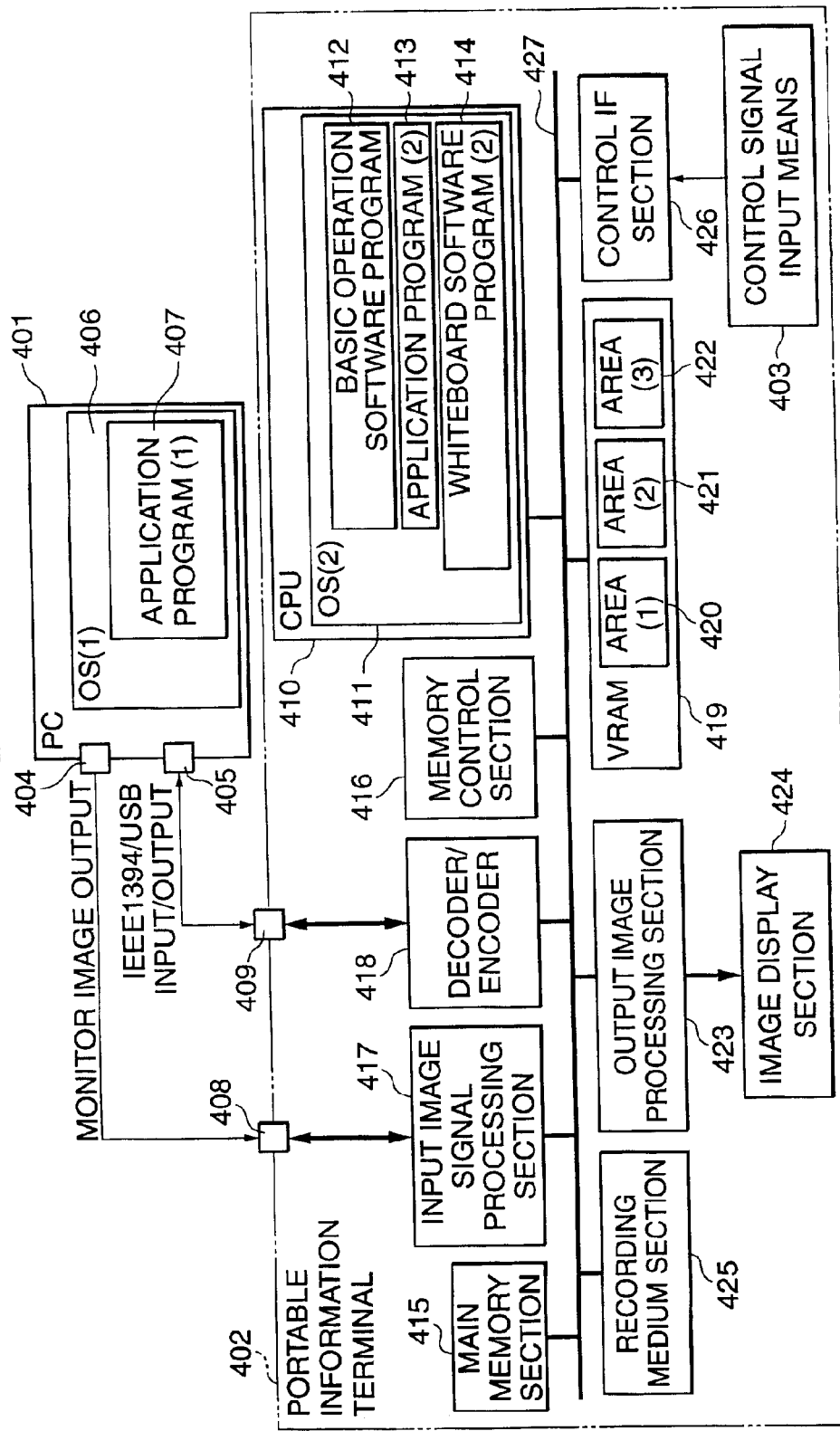
FIG. 6 is a block diagram showing the construction of a control section of the FIG. 5 portable information terminal.

FIG. 6 shows the construction of a control section of the FIG. 5 information processing apparatus.

In FIG. 6, reference numeral 401 designates a PC as an external signal source, while reference numeral 402 designates a portable information terminal using the image display apparatus according to the second embodiment. Reference numeral 403 designates control signal input means for detecting image-plotting signals from a digitizer pen 304 and buttons incorporated in the portable information terminal 402 and inputting the detected signals.

In the PC 401, reference numeral 404 designates an image signal output terminal of the PC 401, and reference numeral 405 an input/output terminal for control signals between the portable information terminal 402 and the PC 401. Reference numeral 406 designates an operating system (OS) (1) for controlling the PC 401, and reference numeral 407 an application (1) which is one of application software programs for operation on the OS (1) 406.

In the portable information terminal 402, reference numeral 408 designates an input terminal for image signals from the PC 401, and reference numeral 409 an input/output terminal for control signals between the portable information terminal 402 and the PC 401. Reference numeral 410 designates a CPU (central processing unit) of the portable information terminal 402, reference numeral 411 an operating system (OS) (2) for controlling the portable information terminal 402, and reference numeral 412 basic operation software operating on the OS (2) 411. The basic operation software 412 controls the internal operation of the portable information terminal 402. For example, an input image signal processing section, a memory control section, a decoder/encoder section, a control IF section, an output image processing section and a recording medium section, all described in detail hereinafter, have operations thereof controlled by the basic operation software 412. Reference numeral 413 designates an application program (2) which is one of application software programs operating on the OS (2) 411. Further, reference numeral 414 designates a whiteboard software program (2) which is one of application software programs operating on the OS (2) 411 to realize the whiteboard function. Reference numeral 415 designates a main memory section of the portable information terminal 402. Further, reference numeral 417 designates the input image signal processing section for decoding an image format of an image inputted by the portable information terminal 402 via the image signal input terminal 408. This section also performs resolution conversion for converting the number of display pixels of the input image to the number of pixels in a display area on an image display section 424, referred to hereinafter, (resolution conversion device).

Reference numeral 419 designates a VRAM memory provided in addition to the main memory section 415 and used exclusively for image processing. The VRAM memory 419 is divided into three memory areas designated by respective reference numerals 420 to 422. Reference numeral 416 designates the memory control section (image synthesis device) for controlling a memory space within the portable information terminal 402. The memory control section 416 controls not only the main memory section 415 but also controls the operation of the VRAM memory 419 in response to an instruction by the CPU 410. Therefore, an image-plotting function of writing image-plotting information into the VRAM memory 419, which corresponds to the whiteboard function performed by the whiteboard software as described in detail hereinafter, and an image synthesis function of synthesizing an image plotted on whiteboard and stored in each VRAM area and an input image from the external PC with each other and storing the synthesized image in another memory area of the same VRAM are performed by the memory control section 416.

Reference numeral 423 designates the output image processing section for converting an image signal transferred from the VRAM 419 to a format which can be displayed by the image display section 424. The image display section 424 is comprised of a reflective or transmission liquid crystal display, a direct-view type liquid crystal display, a self-emitting display (e.g. a CRT), a plasma display panel (PDP), an EL element, an LED, or the like. Reference numeral 425 designates the recording medium section for storing images synthesized by the VRAM 419, the application program (2), the basic operation software program, the whiteboard software program (2) and the like. Reference numeral 426 designates the control IF section (control signal input device) for inputting (coordinate) control signals (i.e. image-plotting signals) from the control signal input means 403. Further, reference numeral 427 designates a bus comprised of a control bus connecting the respective sections to each other and a data bus.

Reference numeral 418 designates the decoder/encoder for decoding or encoding signals, such as an IEEE 1394 signal and a USB signal, inputted or outputted via the control signal input/output terminal 409 between the portable information terminal 402 and the PC 401. The CPU 410 switches the use of a control signal from the control signal input means 403 according to an image display area and transmits the same to the PC 401 as a control signal via the decoder/encoder 418 (control signal switching device). Further, each image data synthesized by the VRAM 419 is also transmitted via the decoder/encoder 418 after having been filed.

Figure 7:
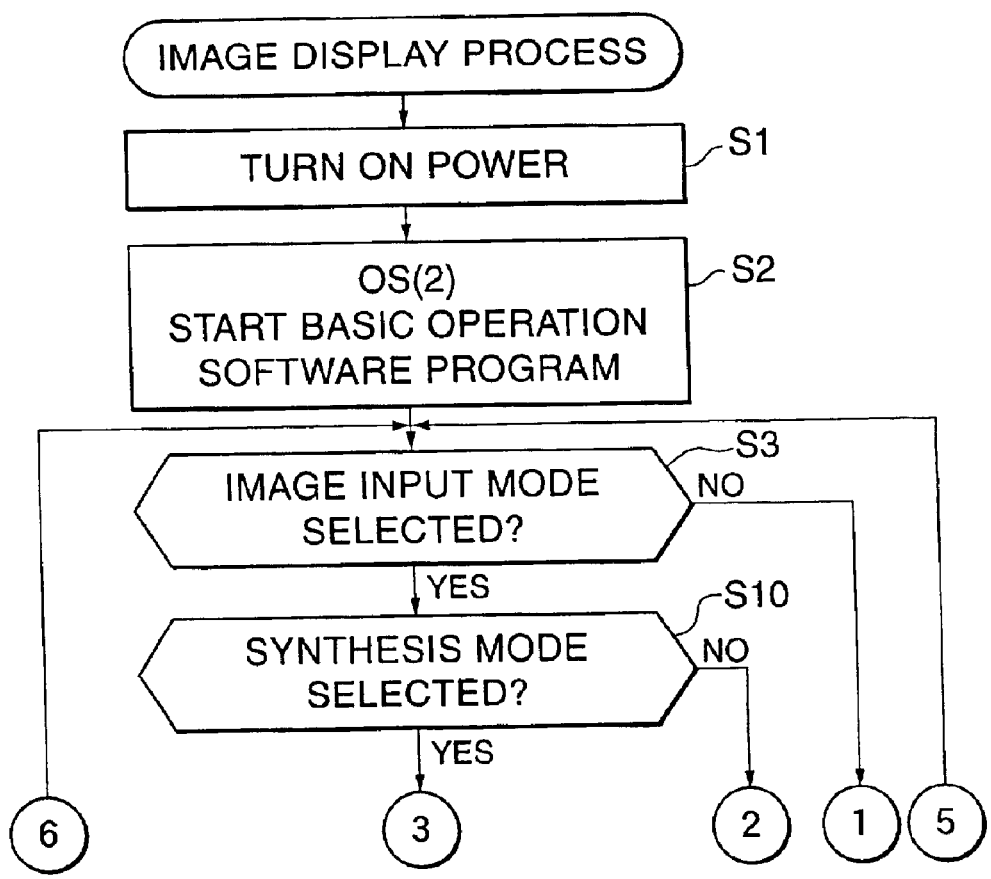
FIG. 7 is a flowchart of an image display process which is executed by the FIG. 5 portable information terminal.
Figure 8:
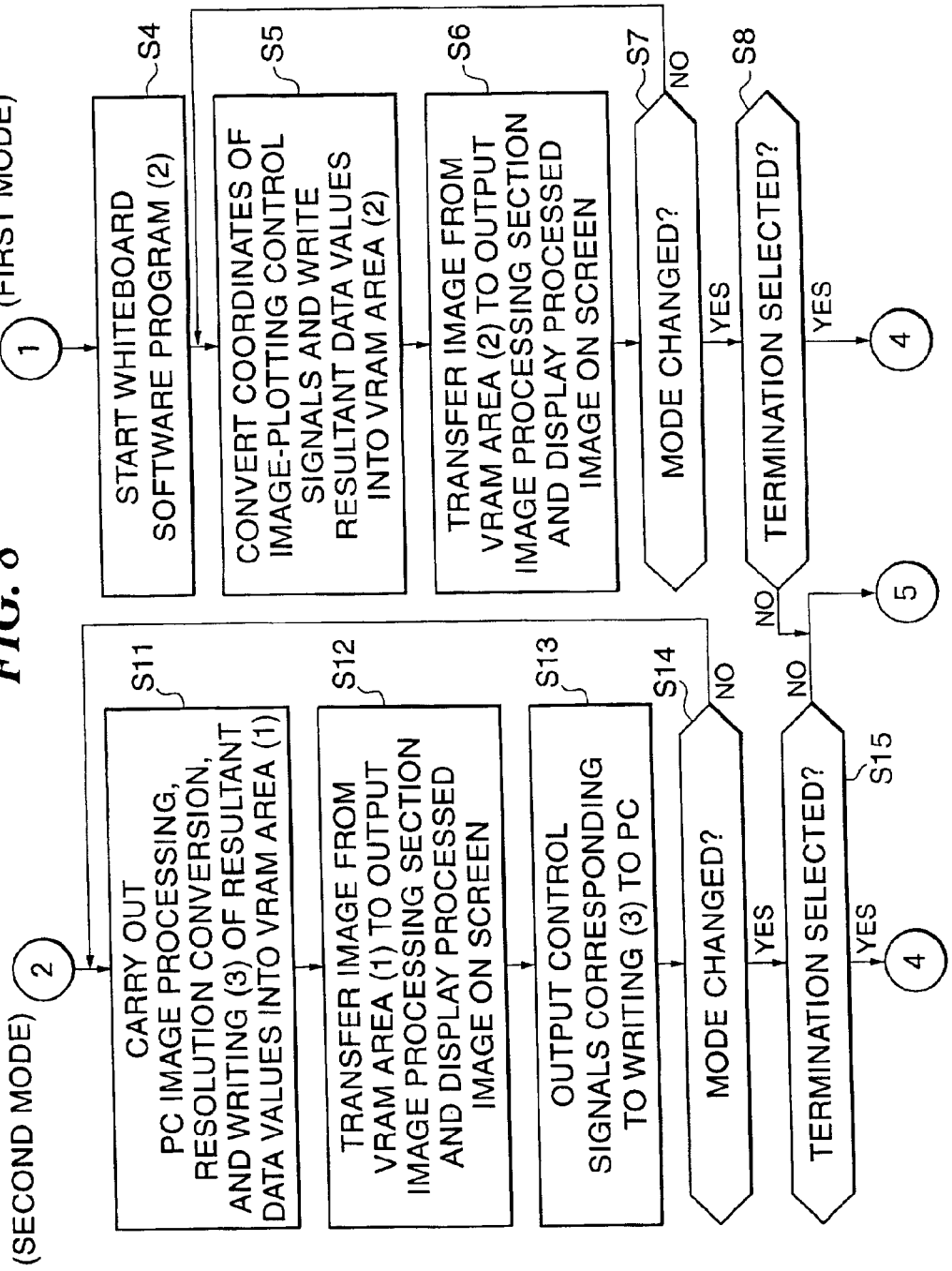
FIG. 8 is a continued part of the FIG. 7 flowchart.

FIGS. 7 to 9 shows a routine for an image display process which is executed by the portable information terminal.

In FIG. 7, when the portable information terminal 402 is turned on at a step S1, the OS (2) 411 and the basic operation software program 412 on the portable information terminal 402 are started at a step S2, whereby the portable information terminal 402 becomes usable. At this time, the CPU 410 cooperates with the memory control section 416 to read programs from the recording medium section 425 and executes the basic operation program by using the main memory 415. At the following step S3, it is determined whether or not an image input mode for inputting an image from the PC 401 has been selected.

If the image input mode has not been selected as a result of the determination at the step S3, i.e. if the first mode has been selected, the whiteboard software program (2) 414 is read from the recording medium section 425 and then executed on the CPU 410 at a step S4. As a result, coordinate control signals inputted from the control signal input means 403 are read onto the CPU 410 via the control IF section 426, and at the same time, the memory control section 416 selects the area (2) 421 within the VRAM 419 to carry out coordinate conversion and writing of data values at a step S5. Then, at a step S6, an image is transferred from the area (2) 421 within the VRAM 419 to the output image processing section 423, and subjected to image processing in a manner adapted to the output thereof, followed by being displayed on the image display section 424. The image data in the area (2) 421 is saved in the recording medium section 425 as a file, or packetized on the CPU 410 and the main memory section 415 and encoded by the encoder/decoder 418 according to the IEEE 1394 or USB standard, so as to be ready for transmission to the PC 401.

At the following step S7, it is determined whether or not mode switching has been performed. If mode switching has not been performed, the program returns to the step S5, wherein image plotting by the whiteboard function is continuously carried out. If mode switching has been performed, the program proceeds to a step S8, wherein it is determined whether or not termination of the program has been selected. If the termination has been not been selected at the step S8, the steps S3 et seq. are executed again, whereas if the termination has been selected, the program is terminated.

If the image input mode for inputting an image from the PC 401 has been selected at the step S3, i.e. if the second mode has been selected, the external PC 401 is started in advance to effect setting of security and the like, followed by the program proceeding to a step S10.

At the step S10, it is determined whether or not the mode for synthesizing an image plotted by the whiteboard function and an image from the PC 401 with each other has been selected. If the synthesis mode has not been selected, the CPU 410 issues an instruction to display a display screen of the PC 401 based on the basic operation software program, whereby the display screen of the PC 401 inputted via the image signal input terminal 408 is subjected to a proper resolution conversion by the input image signal processing section 417, and then writing (3) of the resulting data into the area (1) 420 of the VRAM 419 is performed (step S11).

Then, at a step S12, signals read from the area (1) 420 of the VRAM 419 are transferred to the output image processing section 423 and subjected to image processing in a manner adapted to the output, followed by being displayed as a screen on the image display section 424. Further, at a step S13, the control signal from the control signal input means 403 is subjected to coordinate conversion on the CPU 410 in a manner adapted to the display screen of the PC 401, and then encoded by the encoder/decoder 418 according to the IEEE 1394 or USB standard, followed by being transmitted to the PC 401 as the mouse control signal corresponding to the writing (3).

At the following step S14, it is determined whether or not mode switching has been performed. If mode switching has not been performed, the program returns to the step S11, wherein display of the operation screen of the PC 401 is continuously carried out. If mode switching has been performed, the program proceeds to a step S15, wherein it is determined whether or not termination of the program has been selected. If the termination has not been selected at the step S15, the steps S3 et seq. are executed again, whereas if the termination has been selected, the program is terminated.

If the image input mode has been selected at the step S3, and further the synthesis mode has been selected at the step S10, i.e. if the third mode has been selected, the external PC 401 is started, and setting of security and the like is performed, followed by the program proceeding to a step S16.

At the step S16, a whiteboard software program (2) 414 is read from the recording medium section 425 and operated on the CPU 410. Then, the CPU 410 issues an instruction to capture the display screen of the PC 401. As a result, at a step S17, the display screen of the PC 401 inputted via the image signal input terminal 408 is subjected to a proper resolution conversion by the input image signal processing section 417, and then writing (1) of the resulting data into the area (1) 420 (another memory device) of the VRAM 419 is performed. Further, the plotting control signal from the control signal input means 403 is read onto the CPU 410 via the control IF section 426, and at a step S18, the memory control section 416 selects the area (2) 421 (memory device) within the VRAM 419 and performs coordinate conversion and writing (2) of the data values.

At the following step S19, image information written in the area (1) 420 and area (2) 421 of the VRAM 419, respectively, are subjected to an arithmetic operation for image synthesis on the memory control section 416 according to an instruction from the CPU 410, and then the result of the image synthesis is written onto the area (3) 422 (still another memory device) of the VRAM 419. Then, the area (3) 422 is selected, and the synthesized image is transferred from the area (3) 422 to the output image processing section 423, wherein the image is subjected to image processing in a manner adapted to the output, followed by being displayed on the image display section 424. The image data in the area (3) 422 is saved in the recording medium section 425 as a file, or packetized on the CPU 410 and the main memory section 415 and then encoded by the encoder/decoder 418 according to the IEEE 1394 or USB standard, so as to be ready for transmission to the PC 401.

Further, at a step S20, the use of the signal from the control signal input means 403 is switched according to an image area corresponding to the signal, and a signal that forms part of the synthesized image from the control signal input means 403 and designates a display area for the image from the PC 401 is subjected to coordinate conversion in a manner corresponding to the position of the display screen. Then, the signal subjected to the conversion is encoded by the encoder/decoder 418 according to the IEEE 1394 or USB standard, followed by being transmitted to the PC 401 as the mouse control signal corresponding to the writing (1).

At the following step S21, it is determined whether or not mode switching has been performed. If mode switching has not been performed, the program returns to the step S17, wherein the operation of the PC 401 and plotting on the whiteboard are continuously carried out in a manner adapted to the coordinates of the display area. If mode switching has been performed, the program proceeds to a step S22, wherein it is determined whether or not the termination of the program has been selected. If the termination has not been selected at the step S22, the steps S3 et seq. are executed again, whereas if the termination has been selected, the program is terminated.

According to the process shown in FIGS. 7 to 9, the portable information terminal 402 is capable of operating as a single device having the whiteboard function, and when a network to which the PC belongs and the user of the PC are authenticated, the portable information terminal 402 can also be utilized as a terminal for the PC 401. That is, the portable information terminal 402 can be used both in an environment demanding no security (e.g. the whiteboard function) and in an environment ensuring security (e.g. the application program on the PC 201), so that it can be used in a manner adapted to a selected one of the two kinds of environments. This increases the range of the use of the portable information terminal 402 in places, such as educational institutions and meetings or conferences.

In particular, since an image inputted from the PC 401 and subjected to resolution conversion is synthesized with an image plotted by the whiteboard function built into the portable information terminal 402, it is not necessary to operate any special application software program on the PC 401, which makes it possible to connect the portable information terminal 402 to any PC without any need to select a host PC for connection with the portable information terminal 402. Thus, the portable information terminal 402 can be connected to various types of devices anywhere, and hence the range of its use is increased. Further, the portable information terminal 402 can be connected to such devices irrespective of a difference between platforms, such as OS's.

Moreover, since an image plotted by the whiteboard function or an image synthesized from the plotted image and an input image can be transmitted to an external device or recorded onto a recording medium, and since operations in both an environment demanding no security (e.g. the whiteboard function) and an environment ensuring security (e.g. the application program on the PC 201) and control of display screen areas in the respective two environments can be performed, it is possible to use the same image display section and the same control signal input means 403 to carry out in a unified manner operations of the function built into the body of the image display apparatus and the function of an application program executed on the PC which are on different platforms, thereby realizing a seamless environment.

In the above described embodiments, the image signal input terminal, such as an analog VGA terminal or a DVI terminal, via which a signal is inputted from an external signal source, such as a PC, and the control terminal of the external signal source, such as a USB terminal or an IEEE 1394 terminal, are shown separately from each other. Since image signals, however, are more likely to be transmitted in packets after being compressed e.g. in accordance with the MPEG standard or partially rewritten, it is expected that transmission of image signals will be performed via a USB terminal or an IEEE 1394 terminal as well in the near future. Needless to say, the present invention can be applied to such a case.

For example, when an external signal source, such as a PC, and an image display apparatus or an information processing apparatus using the image display apparatus are connected to each other by a single IEEE 1394 cable, an image signal from the external signal source and a control signal to the external signal source are sent and received by using the same IEEE 1394 decoder and encoder. In this case, the image signal outputted from the IEEE 1394 decoder is decompressed e.g. from its MPEG compressed state and subjected to the aforementioned resolution conversion, and then synthesized with a screen for the whiteboard plotting function. On the other hand, the control signal from the digitizer pen or the like is switched by the CPU and an internal software program to a signal for rewriting by the whiteboard plotting section or to operation information to be sent to the external signal source. Further, the control signal is also used to convert by the CPU and the internal software program from coordinates in a display area on the display screen after the resolution conversion to coordinates corresponding to the image before the resolution conversion, and the results of the conversion are then converted to a transmission signal by the IEEE 1394 encoder, and the transmission signal is transmitted to the external signal source.

Although in the above described embodiments, the external signal source and the image display apparatus or the information processing apparatus are connected to each other by a cable, it goes without saying that radio transmission may be employed without changing the essential features of the present invention.

Further, the objects of the present invention can also be achieved by supplying a system or an apparatus with a storage medium storing software program modules for realizing the above embodiments. In this case, the program modules read from the storage medium achieve the novel functions of the present invention, and the storage medium storing the program modules constitutes the present invention.

In the above embodiments, the program modules are stored in a recording medium section, not shown, of the image display apparatus 202 or in the recording medium section 425 of the portable information terminal 402. The storage medium for supplying the program modules may be a floppy disk, a hard disk, an optical memory disk, a magneto-optical disk, a CD-ROM, an MO, a CD-R, a DVD, a magnetic tape, a nonvolatile memory card, or the like. However, the storage medium is not limited to a specific one, and any medium which is capable of storing the above program modules can be employed.

What is claimed is:

1. An image display apparatus comprising:
   a control signal input device that inputs a control signal;
   an image signal input device that inputs an image signal from an external signal source;
   an image signal processing device that processes the inputted image signal;
   an image display device that displays an image based on the image signal processed by said image signal processing device, on a display screen;
   an operation signal output device that outputs an operation signal to the external signal source;
   a memory device that stores display screen information which can be rewritten by the control signal from said control signal input device;
   an image synthesis device that synthesizes the display screen information stored in said memory device and the image signal processed by said image signal processing device; and
   a control signal switching device that selectively switches use of the control signal from said control signal input device between a signal for rewriting the display screen information stored in said memory device and the operation signal to be outputted from said operation signal output device, according to an instruction from the control signal input device concerning a display area in which the display screen information stored in said memory device is displayed and a display area in which the image signal processed by said image signal processing device is displayed, said display areas being obtained by synthesis by said image synthesis device.

2. An image display apparatus according to claim 1, wherein said image signal processing device includes a resolution conversion device that converts resolution of the inputted image signal.

3. An image display apparatus according to claim 2, further comprising a second memory device that stores the image signal of which resolution has been converted by said resolution conversion device, and wherein said image synthesis device synthesizes the display screen information stored in said memory device and the image signal stored in said second memory device.

4. An image display apparatus according to claim 2, wherein said control signal switching device converts display coordinates of a display area after resolution conversion on the display screen to coordinates corresponding to an image before resolution conversion, before sending the operation signal to said operation signal output device.

5. An image display apparatus according to claim 1, further comprising a third memory device that stores image information obtained by synthesis by said image synthesis device.

6. An image display apparatus according to claim 1, further comprising a transfer device that transfers image information obtained by synthesis by said image synthesis device to an external device.

7. An image display apparatus according to claim 1, wherein said control signal switching device changes a boundary between the display area in which the display screen information stored in said memory device is displayed and the display area in which the image signal processed by said image signal processing device is displayed on an image synthesized by said image synthesis device, based on the control signal from said control signal input device.

8. An image display apparatus according to claim 1, wherein said control signal input device comprises an input device that operates in a manner interlocked with a cursor displayed on the display screen.

9. An image display apparatus according to claim 8, wherein said control signal input device comprises a digitizer pen that virtually plots an image on the display screen of said image display device.

10. An information processing apparatus using the image display apparatus according to any one of claims 1 to 9.

11. An image display method comprising:
    a control signal-inputting step of inputting a control signal;
    an image signal-inputting step of inputting an image signal from an external signal source;
    an image signal-processing step of processing the inputted image signal;
    an image display step of displaying an image based on the image signal processed at said image signal-processing step, on a display screen;
    an operation signal-outputting step of outputting an operation signal to the external signal source;
    a memory step of storing display screen information which can be rewritten by the control signal inputted at said control signal-inputting step;

an image-synthesizing step of synthesizing the display screen information stored at said memory step and the image signal processed at said image signal-processing step; and a control signal-switching step of selectively switching use of the control signal inputted at said control signal-inputting step between a signal for rewriting the display screen information stored at said memory step and the operation signal to be outputted at said operation signal-outputting step, according to an instruction at said control signal-inputting step concerning a display area in which the display screen information stored at said memory step is displayed and a display area in which the image signal processed at said image signal-processing step, said display areas being obtained by synthesis by said image synthesis step.

12. An image display method according to claim 11, wherein said image signal-processing step includes a resolution-converting step of converting resolution of the inputted image signal.

13. An image display method according to claim 12, further comprising a second memory step of storing the image signal of which the resolution has been converted at said resolution-converting step, and wherein the display screen information stored at said memory step and the image signal stored at said second memory step are synthesized at said image-synthesizing step.

14. An image display method according to claim 12, wherein said control signal-switching step includes converting display coordinates of a display area after resolution conversion on the display screen to coordinates corresponding to an image before resolution conversion, before outputting the operation signal at said operation signal-outputting step.

15. An image display method according to claim 11, further comprising a third memory step of storing image information obtained by synthesis at said image-synthesizing step.

16. An image display method according to claim 11, further comprising a transfer step of transferring image information obtained by synthesis at said image-synthesizing step to an external device.

17. An image display method according to claim 11, wherein said control signal-switching step includes changing a boundary between the display area in which the display screen information stored at said memory step is displayed and the display area in which the image signal processed at said image-processing step is displayed, on an image synthesized at said image-synthesizing step, based on the control signal inputted at said control signal-inputting step.

18. A computer-readable storage medium storing a program for executing an image display method, the program comprising:

a control signal input module for inputting a control signal from a control signal input device;

an image signal input module for inputting an image signal from an external signal source;

an image signal processing module for processing the inputted image signal;

an image display module for displaying an image based on the image signal processed by said image signal processing module, on a display screen;

an operation signal output module for outputting an operation signal to the external signal source;

a memory module for storing display screen information which can be rewritten by the control signal inputted by said control signal input module;

an image synthesis module for synthesizing the display screen information stored by said memory module and the image signal processed by said image signal processing module; and a control signal switching module for selectively switching use of the control signal inputted by said control signal input module between a signal for rewriting the display screen information stored by said memory module and the operation signal to be outputted by said operation signal output module, according to an instruction by the control signal input module concerning a display area in which the display screen information stored by said memory module is displayed and a display area in which the image signal processed by said image signal processing module is displayed, said display areas being obtained by synthesis by said image synthesis module.

19. A storage medium according to claim 18, wherein said image signal processing module includes a resolution conversion module for converting resolution of the inputted image signal.

20. A storage medium according to claim 19, wherein the program further comprises a second memory module for storing the image signal of which the resolution has been converted by said resolution conversion module, and wherein said image synthesis module synthesizes the display screen information stored by said memory module and the image signal stored by said second memory module.

21. A storage medium according to claim 19, wherein said control signal switching module converts display coordinates of a display area after resolution conversion on the display screen to coordinates corresponding to an image before resolution conversion, before sending the operation signal to said operation signal output module.

22. A storage medium according to claim 18, wherein said image display module further comprises a third memory module for storing image information obtained by synthesis by said image synthesis module.

23. A storage medium according to claim 18, wherein the program further comprises a transfer module for transferring image information obtained by synthesis by said image synthesis module to an external device.

24. A storage medium according to claim 18, wherein said control signal input module changes a boundary between the display area in which the display screen information stored by said memory module is displayed and the display area in which the image signal processed by said image processing module is displayed on an image synthesized by said image synthesis module based on the control signal inputted by said control signal input module.

* * * * *